A. P. BRUSH.
FRICTION CLUTCH OR BRAKE.
APPLICATION FILED JULY 3, 1907.

930,726.

Patented Aug. 10, 1909.
2 SHEETS—SHEET 1.

Witnesses.
E. B. Gilchrist.
H. B. Sullivan.

Inventor.
Alanson P. Brush
By Thurston Woodward
Attorney

A. P. BRUSH.
FRICTION CLUTCH OR BRAKE.
APPLICATION FILED JULY 3, 1907.

930,726.

Patented Aug. 10, 1909.
2 SHEETS—SHEET 2.

Witnesses
E. B. Gilchrist
H. R. Sullivan

Inventor
Alanson P. Brush
By Thurston Woodward
Attorneys

UNITED STATES PATENT OFFICE.

ALANSON P. BRUSH, OF DETROIT, MICHIGAN.

FRICTION CLUTCH OR BRAKE.

No. 930,726.        Specification of Letters Patent.        Patented Aug. 10, 1909.

Application filed July 3, 1907. Serial No. 381,969.

*To all whom it may concern:*

Be it known that I, ALANSON P. BRUSH, a citizen of the United States, residing at Detroit, in the county of Wayne and State of Michigan, have invented a certain new and useful Improvement in Friction Clutches or Brakes, of which the following is a full, clear, and exact description.

The object of the invention is to provide a controlled self-adjusting and partially self-setting friction clutch or brake; that is to say, a contrivance including at least two friction members, which may be caused to assume a common state of rest or of rotary motion, as the case may be, through friction rendered adequate for the purpose by the torque due to their frictional engagement.

The invention is capable of embodiment in a variety of forms, and is capable of use in almost any situation where friction clutches or brakes are employed. It has been found especially useful in connection with planetary gearing, and the drawings show it associated with said gearing; and show the invention in two forms, one serving as a brake to bring a rotating member to rest, and one as a clutch to impart rotary motion to a rotatable member.

The invention includes an engageable member which is capable of rotation, and an engaging member which is capable of motion about the same axis, and is also capable of being moved longitudinally to bring about a frictional engagement between it and the other member,—said parts being associated with mechanism whereby the torque due to the initial frictional contact of said members will cause the engaging member to move longitudinally to increase the friction pressure,—and, if desired, into such close frictional contact with the other member that, irrespective of the load, said other member may become frictionally locked to the engaging member.

It also consists of numerous other more specifically defined combinations of parts, and in various sub-combinations thereof substantially pointed out in the claims.

Figure 1:
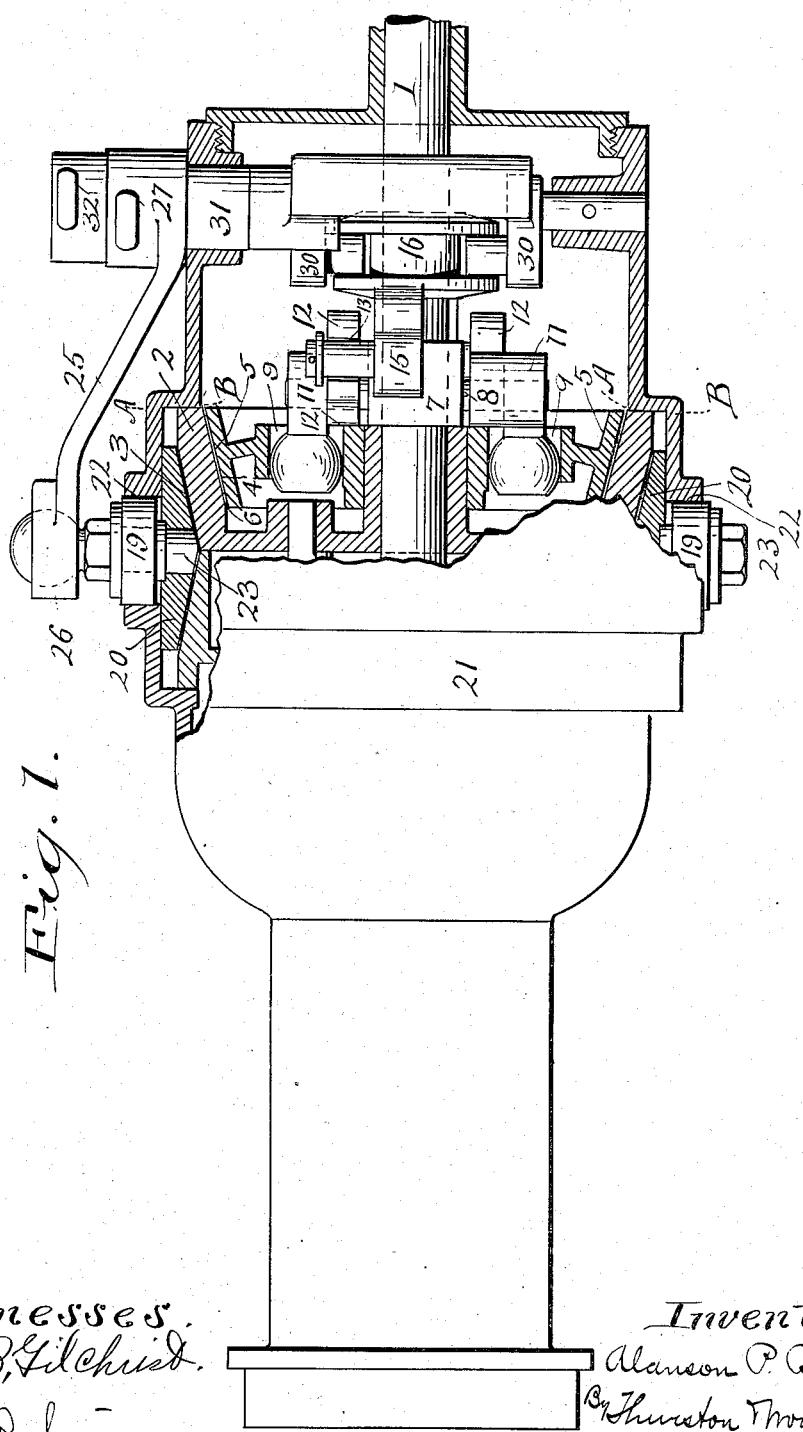
Figure 2:
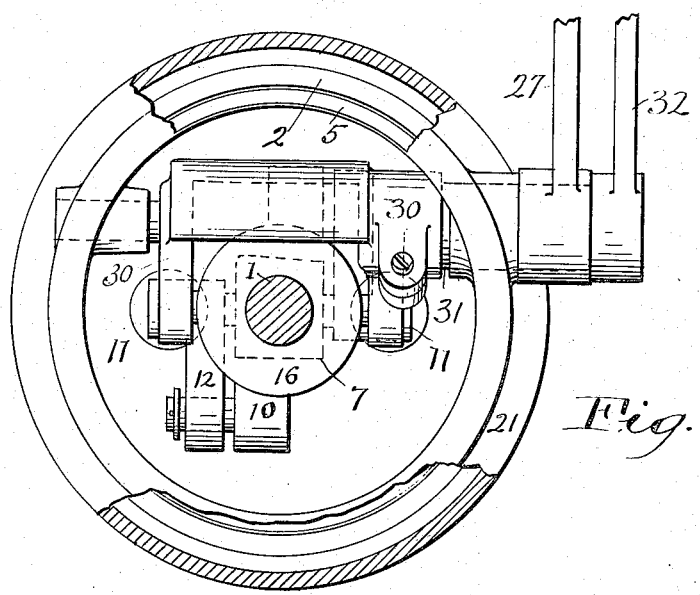
Figure 3:
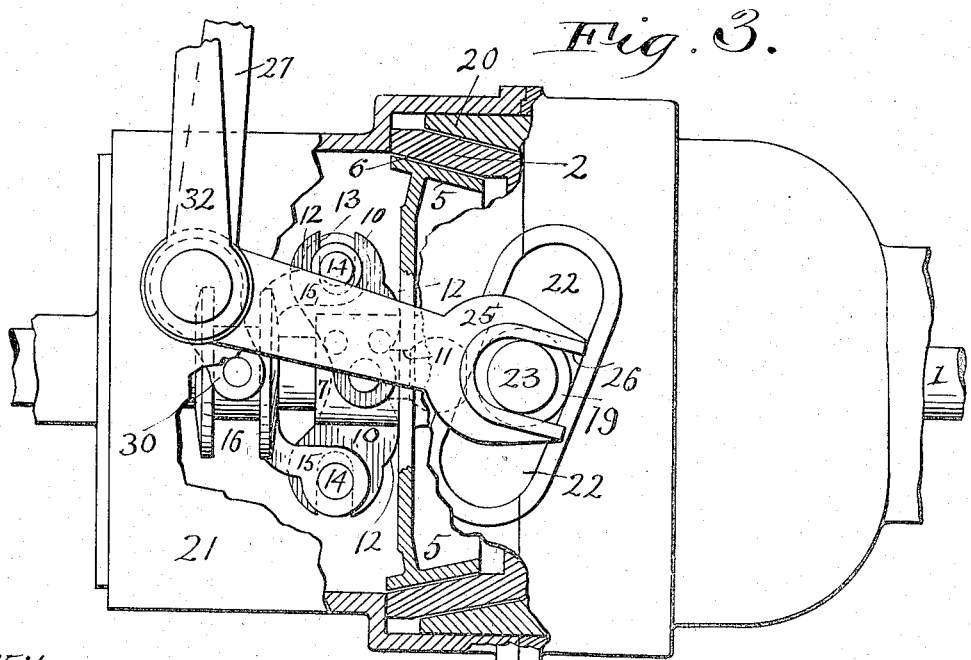

In the drawing, Figure 1 is a plan view partly in section of planetary gearing employing two embodiments of the invention herein disclosed,—one form being arranged to serve as a brake to stop a rotatable member, and the other form being arranged to serve as a friction clutch to rotate the same member. Fig. 2 is an end view with the end cap removed, and partly sectioned in the planes indicated by lines A—A on Fig. 1. Fig. 3 is a side elevation partly in section, of the same mechanism disclosed in Fig. 1.

Referring to the parts by numerals, 1 represents a driving shaft; 2 represents the member which is to be rotated or stopped as the case may be. It is independently rotatable about the same axis as shaft 1, and as shown is mounted thereon. It has a conical outer periphery 3, and a conical inner periphery 4.

5 represents the engaging member of the clutch, which member is rotatably mounted upon the same axis as the shaft. In the specific form shown, it is rotatably mounted upon the hub of the member 2. Mechanism to be described causes this member to rotate in substantial unison with the shaft 1, but permits said member to turn through a small arc independently of the shaft. The member 5 has an external conical surface 6 which is adapted to engage with and fit the internal conical surface 4. It is by the longitudinal movement of the member 5 toward the member 2 that the frictional engagement of the conical surface is brought about,—it being understood that the member 2 has no capacity for longitudinal movement. Secured to the driving shaft 1 is a collar 7 having oppositely extended studs 8. On each of these studs a bell crank lever 10 is mounted. One substantially horizontal arm 11 of each lever has a ball shaped end which enters and substantially fits a hole 9 in the engaging member 5. The other arm 12 of each of these bell crank levers extends at substantially right angles to the other arm, and its outer end is slotted as at 13 and receives a pin 14 carried by an arm 15 which is attached to a sliding sleeve 16 on the shaft 1. The two arms 12, one attached to each of the levers 10, extend to opposite sides of the shaft. There are two of the arms 15 which lie on opposite sides of the shaft, so that their pins 14 may be engaged respectively in the slots in the ends of these lever arms.

It will be understood that when the sliding sleeve 16 is normally held against longitudinal movement, the levers 10 cannot rock. Therefore, since they are carried by a sleeve fixed to the shaft, motion is transmitted from the shaft through the said collar and bell crank levers 10 to the member 5, compelling it to rotate in unison with the shaft. Each of the arms 12 has, on that edge which faces the member 5, the shape of a cam, which is adapted to engage with said member 5. When, by the movement of the sliding sleeve 16 toward the collar 7, the levers 10 are rocked, these cams push the engaging member 5 longitudinally. Incidentally the member 5 is turned slightly relative to shaft 1. The torque due to this frictional engagement and the inertia of the member 2 tends to retard the member 5 and cause it to lag behind the shaft 1 by which it is driven. This lag or slight rotation of member 5 relative to the shaft causes the rocking of the levers 10 in that direction which causes the cams thereon to press more strongly against the face of the member 5 and to push it longitudinally so as to increase the friction between the engaging surfaces on the members 2 and 5. The greater the load or resistance of the member 2 to assuming a condition of motion uniform with that of the member 5,—that is to say, the greater the torque, the farther will member 2 be turned on shaft 1, and the greater will be the pressure of the cams against the engaging member; and, therefore, the greater will be the frictional pressure between the engaging surfaces. It will be seen, therefore, that while the action of the device is controlled so as to bring about or prevent the initial contact of the friction surface, the device may be self-setting and self-adjusting thereafter. Once an initial frictional engagement is brought about between the friction surface, that friction will be automatically increased until the desired maximum is produced. It will be understood that by varying the relative lengths of the arms of the levers 10, and the shape of cams on the arms 12, the maximum friction pressure attainable may be varied, and also the time in which that maximum frictional pressure is attained.

The invention is embodied in a different form to constitute the brake.

20 represents the engaging member for stopping the member 2. It is a ring surrounding said member having an inclined conical inner friction surface opposed to the external conical friction surfaces on said member 2. This ring is fitted within and supported by the fixed external casing 21. Obviously, if said ring be moved to the right in Fig. 1, it will bring its conical friction surface into engagement with the opposed surface on member 2.

In the casing 21 are two inclined or spiral slots 22 extending through a short arc around the casing. Two studs 23 are secured to the ring, which studs pass out through these spiral slots. On each stud is a friction roll 19, whose diameter is just a trifle less than the width of the slot, and this roll lies in the associated slot.

A lever 25 having a forked outer end 26 is suitably mounted and is provided with a suitable device 27 for rocking it. A ball-shaped end is formed on the outer end of one of the studs 23 fixed to the clutching ring, and is embraced by the fork 26. By rocking this lever 25 in one direction or the other, this ring is caused to turn through a small arc about the axis of the shaft 1. As it is so turned, it is compelled to move longitudinally, at a rate determined by the inclination of slots 22, into or out of engagement with member 2. As soon as the friction resulting from this engagement is sufficiently strong for the purpose ring 20 will be turned, and therefore will be moved longitudinally in that direction which causes it to press with greater force upon the member 2, thereby insuring the setting of the brake strongly enough to hold the member 2 immovable.

The sliding sleeve 16 may be moved by a fork lever 30 secured to a rock shaft 31; and the lever 25 may be loosely mounted on said rock shaft, so that each may be independently moved. The lever arms 32 and 27 may be respectively fast to the rock shaft 31 and lever 25 for turning them. When the described mechanism is part of a planetary gear system, some selective operating device should preferably be used, which will permit the operation of either the clutch or brake, but only when the other is not in use. Such a device is fully described in a copending application.

The invention hereinbefore described is not limited to use as a part of a planetary gear system,—nor is it limited to any particular form of the friction surfaces. They may be of any form which may be brought into engagement through the longitudinal movement of one of the friction members. It is also apparent that the generic invention is capable of embodiment in widely different specific forms, two of which are shown and described. Some of the appended claims are intended to cover the invention generically, irrespective of the specific form thereof.

Having described my invention, I claim:

1. In a friction clutch or brake, the combination of an engageable member adapted to be turned upon its axis but incapable of longitudinal movement, a concentric driving shaft, a concentric engaging member loosely mounted on the driving shaft,—said two members having friction surfaces adapted to be engaged or disengaged by the longitudinal movement of the engaging member, mechanism for transmitting rotary motion from the driving shaft to the engaging member but permitting a slight relative rotary movement between said parts, means carried by said transmitting mechanism which will move the engaging member longitudinally whenever there is any relative rotary movement between said engaging member and driving shaft, and vice versa.

2. In a friction clutch or brake, the combination of an engageable member, a concentric driving shaft, a concentric engaging member for engaging the other member, a movable device mounted on the driving shaft for transmitting motion therefrom to the engaging member, means carried by said transmitting member for moving the engaging member longitudinally into frictional engagement with the engageable member, and means whereby the torque produced through such frictional engagement moves the engaging member longitudinally toward the other member.

3. In a friction clutch or brake, the combination of an engageable member, a concentric driving shaft, a concentric member for engaging the other member, a movable device mounted on the driving shaft for transmitting motion therefrom to the engaging member, means carried by said transmitting member for moving the engaging member longitudinally, the construction being such that the lag of the engaging member relative to the driving shaft causes such movement of the transmitting member as causes the longitudinal movement of the engaging member.

4. In a friction clutch, the combination of an engageable member, a driving shaft, an engaging member concentric therewith and having longitudinal holes through it, a lever pivoted to the driving shaft on a laterally extended pivot, said lever having one portion which enters the hole in said engaging member and having also a cam for engaging with the face of said engaging member, and mechanism for rocking said lever.

5. In a friction clutch, the combination of a rotatable engaging member, a driving shaft, an engaging member concentric therewith and having a longitudinal hole through it, a lever pivoted to the driving shaft on a laterally extended pivot, said lever having one portion which enters the hole in said engaging member and having also a cam for engaging with the face of said engaging member, a sliding sleeve, and a pin carried thereby, said lever being provided with a slot in one of its arms into which said pin projects.

6. In a friction clutch or brake, the combination of an engageable clutch member, means limiting the longitudinal movement of said clutch member, a concentric shaft rotatable independently of said engageable clutch member, an engaging clutch member movably mounted on said shaft,—said two clutch members being provided with friction surfaces which will be caused to engage or disengage by the longitudinal movements of the engaging member, mechanism intermediate of said engaging member and its shaft by which the movement of the engaging member longitudinally toward the engageable member is necessarily accompanied by a backward turning of said engaging member relative to its shaft, and vice versa, and mechanism for moving said engageable member relative to its shaft into initial contact with the engageable member.

In testimony whereof, I hereunto affix my signature in the presence of two witnesses.

ALANSON P. BRUSH.

Witnesses:
E. L. THURSTON,
E. B. GILCHRIST.